Patented May 25, 1937

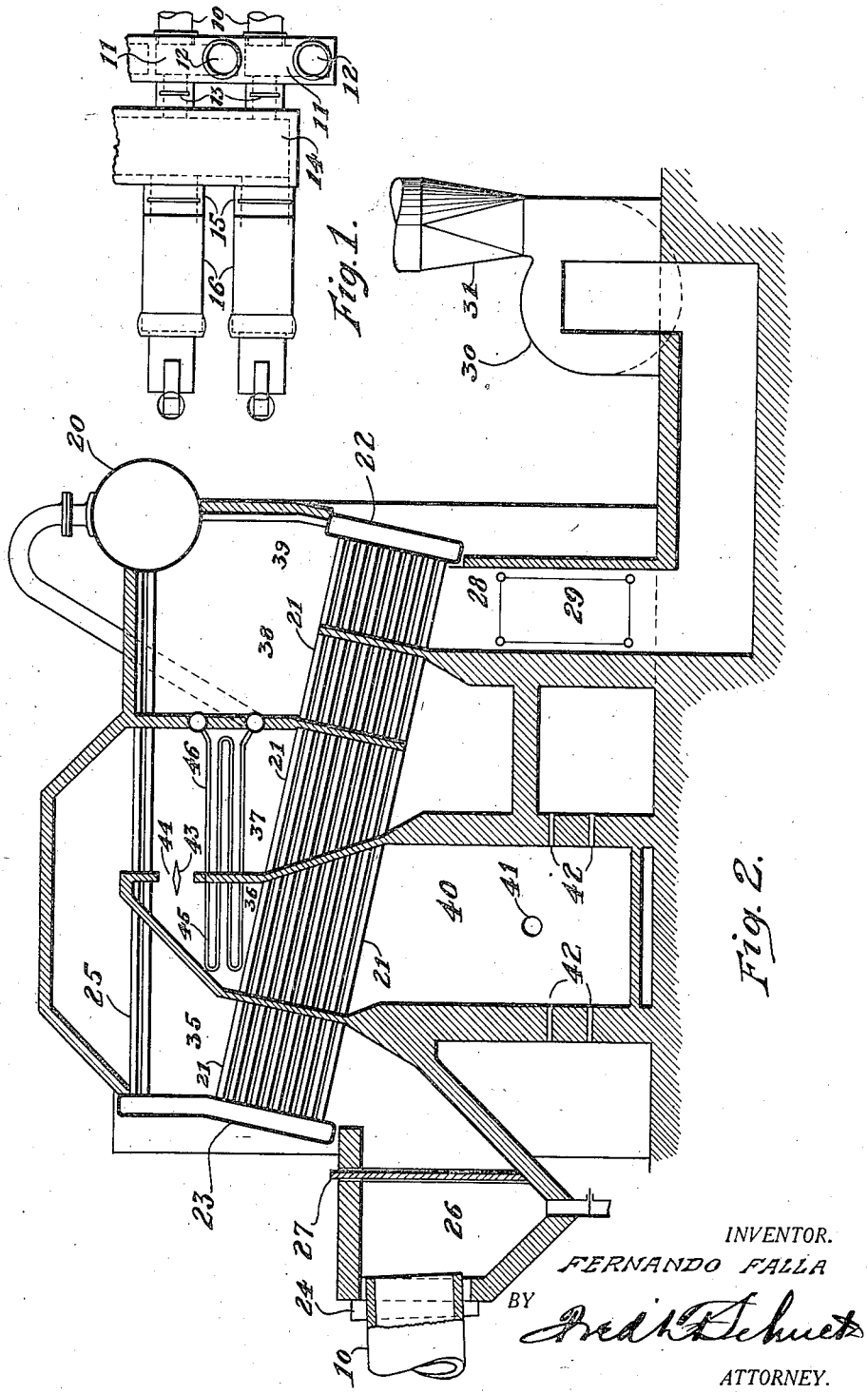

2,081,697

UNITED STATES PATENT OFFICE 2,081,697

METHOD AND APPARATUS FOR SUPPLYING ADDITIONAL HEAT TO WASTE HEAT BOILER PLANTS

Fernando Falla, Millburn Township, Essex County, N. J., assignor to Edge Moor Iron Company, Edge Moor, Del., a corporation of Delaware Application December 31, 1931, Serial No. 584,252
Renewed October 23, 1936

10 Claims. (Cl. 122—7)

The invention relates to a waste heat boiler plant adapted to utilize the waste heat from industrial furnaces or like apparatus affording a source of waste gaseous heating medium, and to a method of operating the said boiler plant.

In the operation of such boiler plants, it occurs from time to time, as for instance when a furnace or other industrial plant is temporarily shut down, that the heat or volume of the waste heat gases is not sufficient to produce in the waste heat boiler plant the desired amount of steam required in the operation of other apparatus dependent on said boiler plant for its power. When the generation of such total steam power is insufficient, it has been the practice to resort to supplementary installations of entirely independently fired boilers to make up the additional steam required. This, however, entails considerable expense and requires the installation of further apparatus which it is the purpose of the present invention to avoid.

A general object of the invention, therefore, is to consolidate in one steam-generating plant operating with waste gaseous heating media, which are generally not sufficient to generate all of the required power, a further furnace element so arranged and combined with the steam-generating means operated by the waste gas heating medium that the boiler plant as a whole may be operated solely with such waste gaseous heating medium, as an auxiliary independently fired boiler plant, or as a combination of both. That is to say, steam may be generated in said boiler plant independently of the waste gaseous heating medium admitted thereto as well as simultaneously therewith.

A further object of the invention resides in the provision of a novel construction of boiler furnace which enables superheating of the steam generated therein under either of the aforesaid modes of operation as well as under a combined operation.

In carrying out the invention, a novel boiler plant is constructed with two independent inlets for gaseous heating media, the one being for connection with the industrial furnaces or like apparatus which afford the waste gaseous heating medium and the other receiving a gaseous heating medium from an independently fired furnace associated with the boiler plant. The boiler of the novel plant is to this end provided with a plurality of passes coordinated with the said inlets such that the two gaseous media are not intermingled until both have first been in contact with the boiler tube portions of the respective passes. The said gaseous media are thereby sufficiently cooled to avoid temperatures which would tend to fuse or sinter foreign matter in the waste gaseous heating medium, such as dust, grit or dirt carried in suspension therein. Because of this sintering tendency, it is not practicable to burn fuel in the path of these waste gases from the industrial furnaces in order to boost the temperature thereof for increasing the steam generation since, if their temperature is raised above the fusing point, the foreign matter then condenses on the boiler tubes to insulate the same from the heat of the gases as well as constricting the passages among the boiler tubes.

A superheater for the generated steam may be arranged so as to lie in part in the path of the waste gaseous heating medium and in part in the path of the gaseous heating medium from the independently fired furnace, as well as being subjected to the intermingled gaseous media when both are present.

The nature of the invention, however, will best be understood when described in connection with the accompanying drawings, in which:

Fig. 1 is a diagrammatic plan view illustrating the general layout of a waste heat utilization plant.

Fig. 2 illustrates a longitudinal section, and part side elevation, of the novel waste heat boiler installation.

Fig. 4 is a similar view illustrating a further modification in the arrangement of the superheater, while

Figure 3:
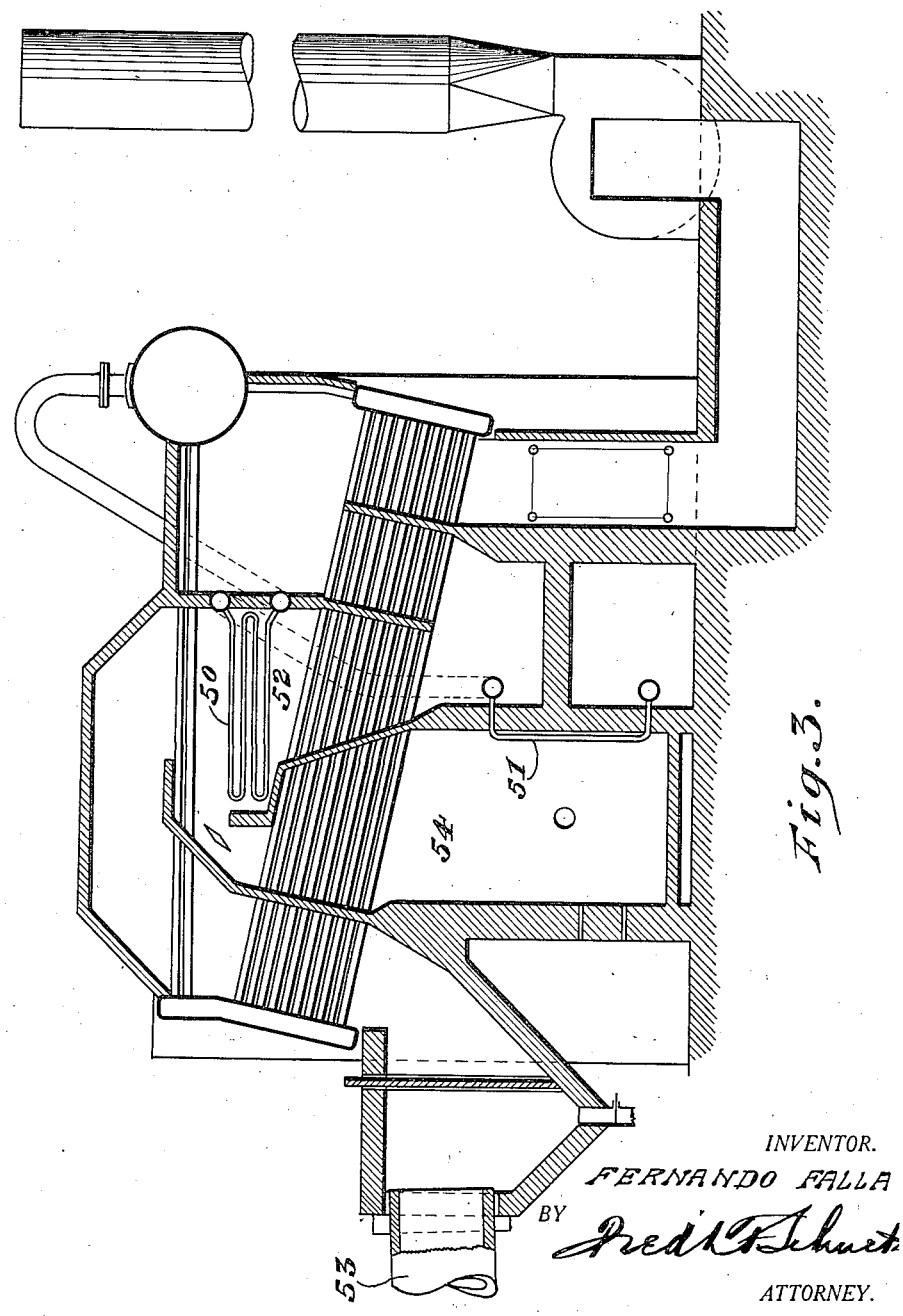
Fig. 3 is a similar view illustrating a modification in the location of the superheater.

Referring to the drawings, more particularly Fig. 1 thereof, 10 designates, for example, a plurality of rotary cement kilns delivering their waste gases into chambers 11 from which, as usual, stacks 12 lead to the atmosphere when it is not desired to use the waste gases. Flues 13 also lead from these chambers to a common waste flue 14 from which a further flue or flues 15 connects the common flue with one or more of the novel waste heat boiler plants 16 forming the subject matter of the present invention.

In its simplest embodiment, this boiler installation comprises a conventional type of cross-drum boiler, Fig. 2, in which 20 designates the drum thereof and 21 the main bank of tubes connected between the headers 22 and 23 while 25 designates the circulating tubes of the boiler. The boiler setting is provided with an inlet or chamber 26 which communicates with the further flue 15 from the common flue 14 to furnish waste gaseous heating medium to the boiler; or, the kiln end may communicate directly with the chamber 26, as shown. Where the higher end of the kiln 10 enters directly the chamber or inlet 26, the end of such kiln is provided with a seal 24 to avoid excess air leakage at this point.

A damper 27 is located in the inlet to serve to cut off communication with the introduced gases from the kiln or kilns 10 when the same are not desired or not available. The outlet 28 of the boiler setting, and in which is located if desired an economizer 29, connects with a suitable fan or the like 30 for drawing gaseous media through the setting and over the bank of tubes as is well understood, said fan discharging the spent gases into a stack or the like 31 for final discharge.

The bank of tubes 21 is arranged with a plurality of passes, in the present instance five, to wit: the passes 35, 36, 37, 38 and 39, although in its simplest embodiment the invention contemplates merely a pair of passes—one for initially receiving the incoming waste gaseous heating medium from the inlet 26 and the other a gaseous heating medium developed in a supplemental furnace 40 associated with the boiler. This latter furnace is fired, for example, by a gas, oil or powdered fuel burner represented at 41, it being preferred to admit the fuel with insufficient air for combustion, the remainder being made up by air admitted through openings 42 in the walls of furnace 40 under the suction of the fan 30.

When the furnace 40 is in operation, heated gases will be drawn through the pass 36 to the pass 37, it being preferred to include an intermediate control damper 43 in the throat or opening 44 between the passes to enable the effective cross-sectional area of said throat to be varied when necessary. Furthermore, when furnace 40 is not in operation, this damper will be turned to close off the throat 44 so that with damper 27 open and waste gaseous heating medium supplied therethrough, the boiler may operate as a straight waste heat boiler. Similarly, when damper 27 is closed and the damper 43 opened, the supplemental furnace may be operated solely, the boiler then functioning as a straight fuel fired boiler.

When the boiler is operated solely under the action of furnace 40, the portion of the bank of tubes in the first pass 35 will remain substantially inactive. This condition would obtain, for example, when the kilns are shut down and steam is nevertheless required.

When the kilns are active, waste gaseous heating medium therefrom will be received at the inlet 26 and with damper 27 open will flow through the pass 35 to the pass 37 and thence out through the remaining passes 38 and 39 to the stack 31, the portion of the bank of tubes in the pass 36 then remaining substantially inactive. If, however, the heating effect of this waste gaseous heating medium is insufficient for the steam required of the boiler plant, the furnace 40 will be put in operation acting on the portion of the bank of tubes in the pass 36. This considerably supplements the generating capacity of the boiler plant, and the portion of the bank of tubes in said pass will extract sufficient heat from the heating gases resulting from the operation of furnace 40 to cool these gases to an extent such that they will not, when mingled in the pass 37 with the waste gaseous heating medium, cause fusing of any foreign matter entrained with this medium.

The boiler plant may thus be operated either solely with the waste gaseous heating medium from the kilns or with the heating gases from the furnace 40, as well as jointly, and a very flexible arrangement in the generation of steam by the boiler plant is provided thereby.

When the boiler plant is to operate jointly, using the two aforesaid sources of heating media, proper control of the drafts required is necessary. In practice, an industrial furnace invariably requires more draft than any auxiliary fuel fired furnace. The throat or restriction 44 is provided, therefore, in order to produce an adequate draft loss so that by suitably regulating the position of damper 43, the same may adequately control the necessary draft for the auxiliary fuel furnace 40.

Furthermore, the boiler may be provided with a superheater having the two portions 45 and 46 separated such that the former portion is located in the pass 36 and the latter in the pass 37. It is possible, therefore, to subject the superheater in part to the heating gases from furnace 40 and in part to the waste gaseous heating medium and in part also to the intermingled gaseous media when the boiler plant is functioning under joint operation of both the kiln gases and the supplemental furnace. This arrangement accommodates the degree of superheat to the increased firing resulting from the operation of the supplemental furnace.

In Fig. 3, the arrangement of superheater tubes is somewhat altered in that the two portions 50 and 51 thereof are substantially independent, the former being located in the pass 52 in which the gases from the kiln 53 and supplemental furnace 54 are caused to intermingle.

The other portion 51 of the superheater tubes is, in this embodiment, located in the furnace 54 itself and the tubes are therefore exposed to a much higher temperature than is the case in the previously described embodiment in which a portion of the superheater was subjected to the heating gases from the supplemental furnaces only after heat had been extracted therefrom by the corresponding portion of the bank of boiler tubes in the pass. The superheater portion 50 thus constitutes a convection type of superheater while the portion 51 is a radiant type superheater. The operation of the boiler plant is otherwise precisely similar to that hereinbefore described.

Figure 4:
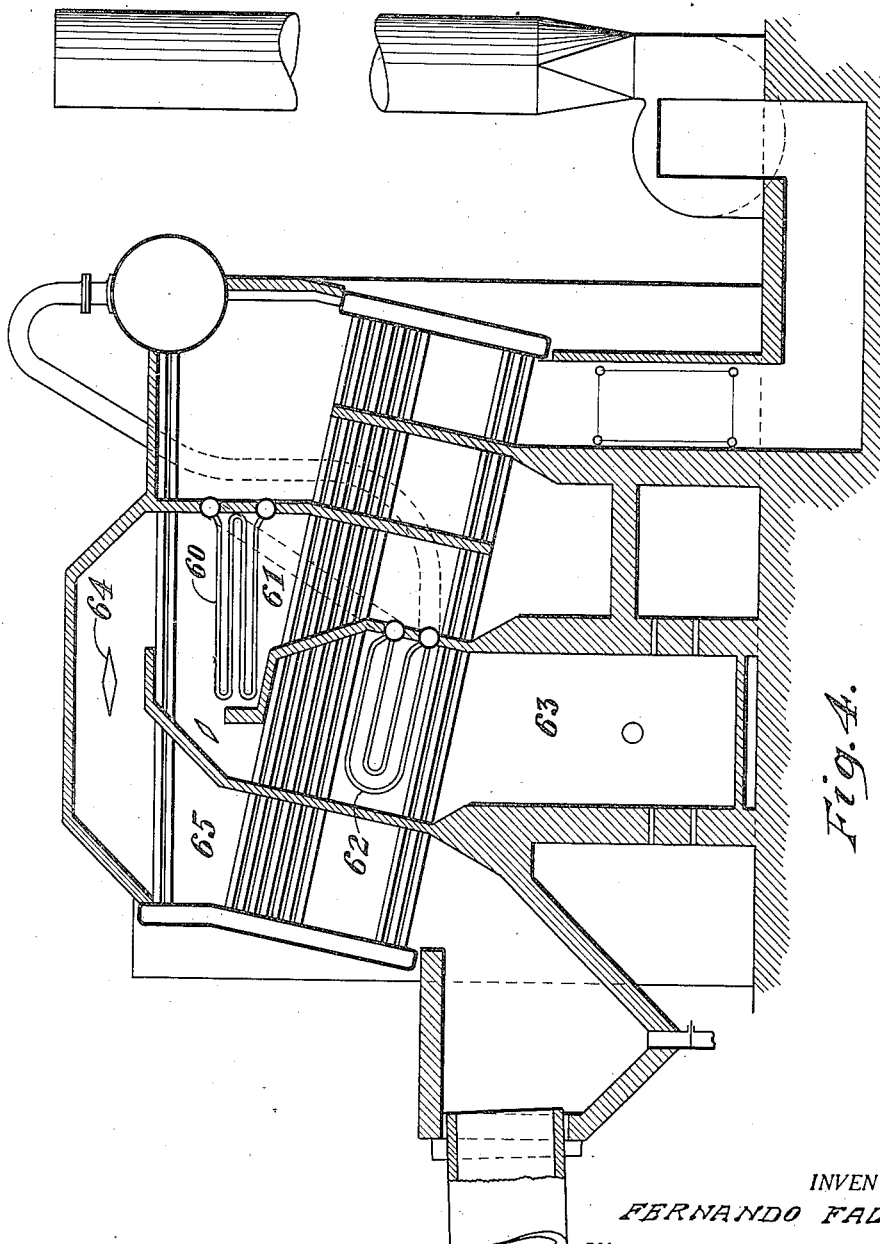

In Fig. 4, another alternative arrangement with respect to the positioning of the superheater is indicated. In this arrangement a convection type superheater 60 is located in the path of the intermingled gases, as in being located in the pass 61, while an inter-deck superheater 62 is provided in advance of the superheater 60 and in the portion of the bank of tubes subjected to the gaseous heating medium from the supplemental furnace 63, and is designed to take care of the superheat for the steam generated by the said supplemental furnace. Furthermore, in thus positioning the superheater 62 in advance of and in series with the superheater 60 and between the boiler decks, no cooling or chilling effect on the superheated steam is had in case the supplemental furnace 63 is shut down.

In the provision of the inter-deck superheater 62, it is possible to obtain a very high degree of superheat when the supplemental furnace is in use and also when the waste gaseous heating medium is at a comparatively low temperature and wholly inadequate to raise the steam to a high pressure with high superheat.

When the boiler plant is operated solely with waste gaseous heating medium, it is possible with this arrangement to generate steam at low pressure and low superheat; and when operated solely by the supplemental furnace, the pressure and superheat obtainable may be as high as desirable and considerably higher than that possible in using only waste gaseous heating medium therein.

A further modification is indicated, more particularly in the location of the damper 64 for the incoming waste gaseous heating medium, this damper, in the present embodiment, being positioned beyond the first pass 65 of the portion of the bank of boiler tubes rather than in advance of the same as in the embodiment shown in Figs. 2 and 3. The operation of the boiler plant is otherwise the same.

Figure 5:
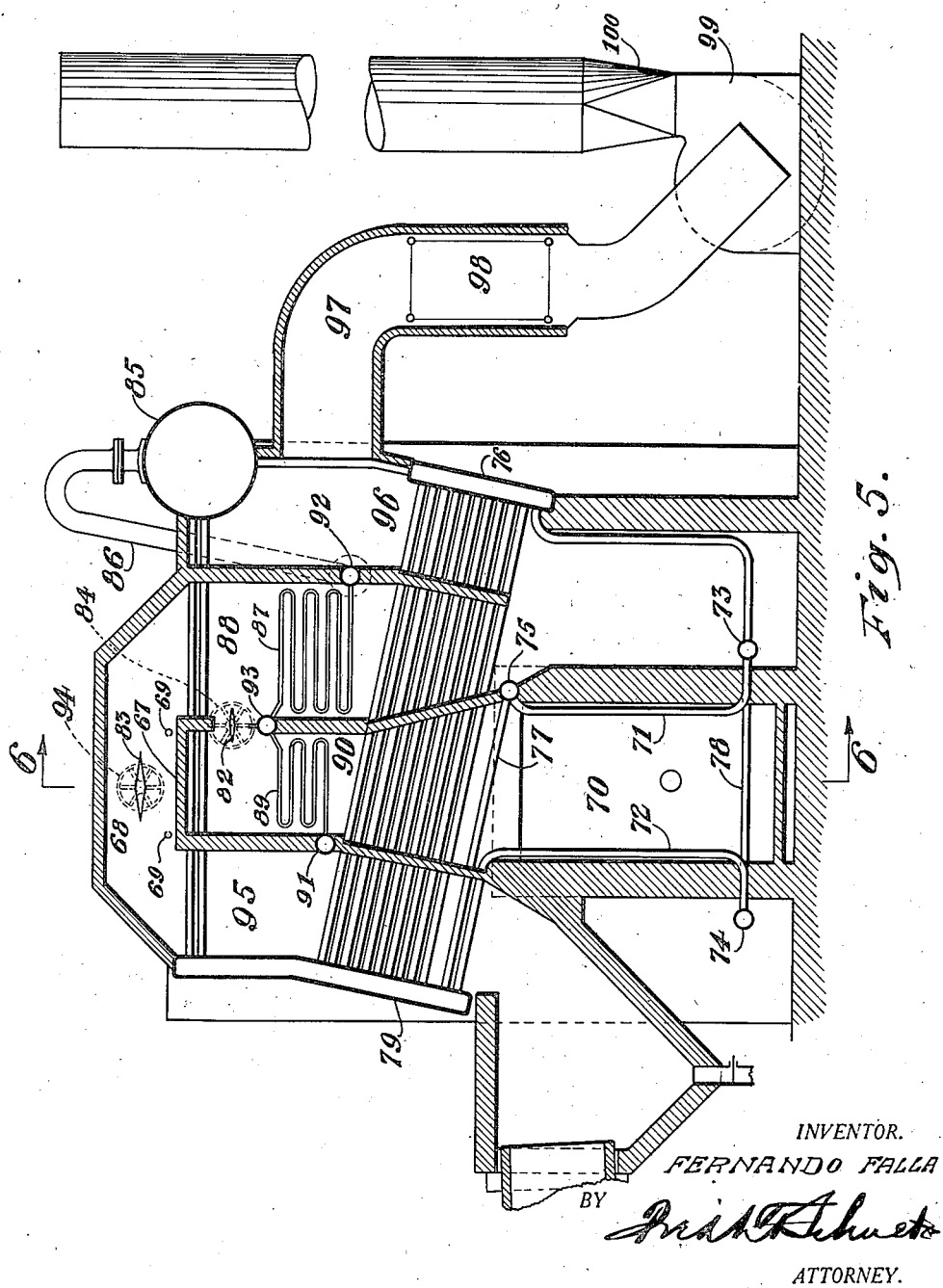
Fig. 5 shows another modification in the arrangement of said superheater.
Figure 6:
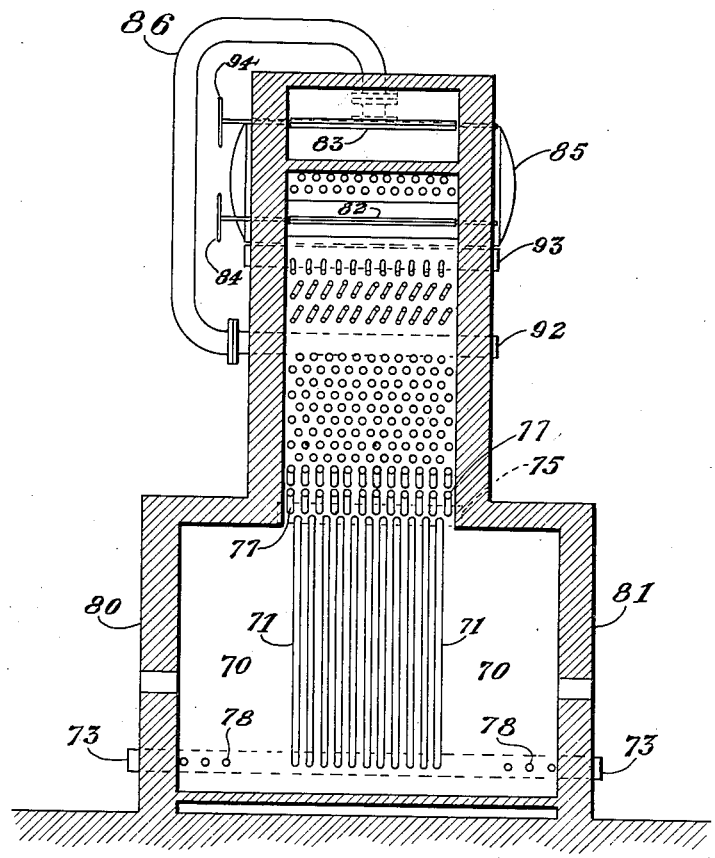
Fig. 6 is a transverse section taken on the line 6—6, Fig. 5 of the drawings.

Another modification is set forth in Figs. 5 and 6 of the drawings, the supplemental furnace 70 in this embodiment being protected by water walls 71 and 72 formed of tubing connected to the various headers 73, 74 and 75. The water from the boiler is taken on its down-coming circulation at the bottom of boiler header 76 of the bank of tubes and is fed by its own circulation to the header 73 which feeds water through the tubing 71 and thence to the header 75 so as to return this water to the main circulation of the boiler through the tubes 77. A portion of the water that has entered header 73 circulates through tubes 78 at the bottom of the furnace into the header 74 so as to feed the tube 72 and from which it is directed to the main boiler circulation as at the header 79 of the bank of boiler tubes.

Also, the opposite walls 80 and 81 of the furnace are spaced further apart, Fig. 6, than in the arrangement hereinbefore set forth so as to provide greater furnace volume.

A further innovation in the construction of a superheater is disclosed in this embodiment of the invention. For example, steam from the drum 85 is led by a steam main 86 to the first superheater 87 located in the pass 88 for the intermingled gaseous media. The steam then flows to the second superheater 89 located in the pass 90 of the supplemental furnace and from the same to a header 91 from which the steam is taken for use. A header 92 is provided between the main 86 and superheater 87, and similarly a header 93 is provided between the superheater 87 and superheater 89, allowing the spacing of the elements of the superheaters to be made in conformity with the gas flows and temperatures of the respective passes.

Furthermore, the boiler plant as indicated in Figs. 5 and 6 of the drawings provides for only four passes, a pass 95 in advance of the pass 90 being provided and a pass 96 beyond the pass 88, the discharge from the boiler being immediately below the drum 85 through the flue 97, which contains the economizer 98, to the discharge fan 99 and stack 100.

Also, the dampers 82 and 83 are disposed similarly to those indicated in Fig. 4, and external hand wheels 84 and 94 are provided for operation of said dampers 82 and 83, respectively. As the horizontal floor surface 67 of chamber 68 may accumulate dust to the extent that it may interfere with the proper operation of damper 83, suitable soot blower elements 69 are provided so as to clean from time to time the said surface 67 of any accumulated material.

Figure 7:
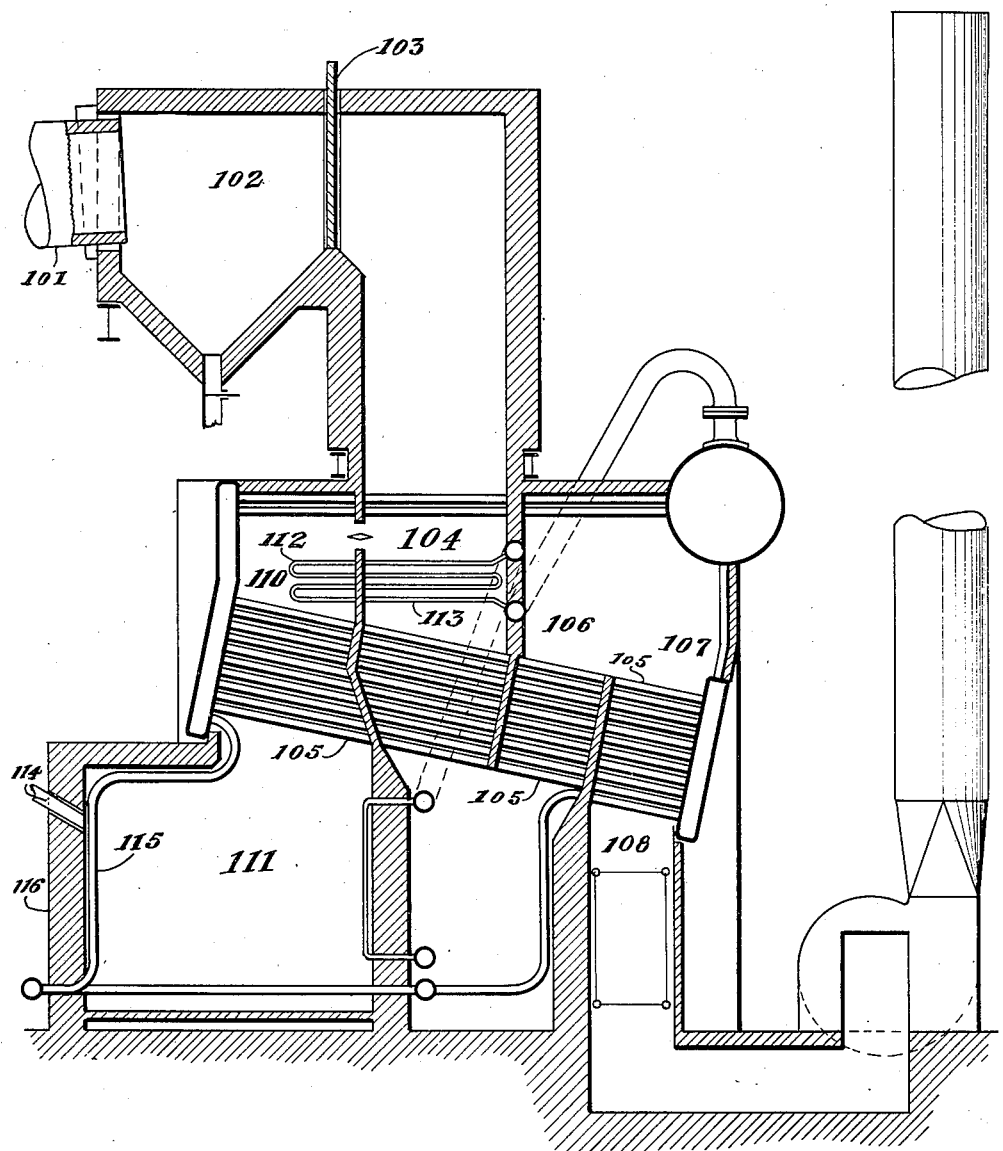
Fig. 7 is a longitudinal section and part side elevation illustrating a modification in the arrangement of the inlets for the waste gaseous heating medium and the supplementary gaseous heating medium.

In some installations, reference being had to Fig. 7, the flue or outlet 101 of the industrial furnaces or kilns is located relatively high with respect to the ground level, and it is not desirable to bring the waste gases therefrom down to a lower boiler level. For example, kiln end 101 for the waste gaseous heating medium may be arranged to enter the boiler plant at the inlet chamber 102 located at the top of the boiler plant, said inlet being provided with the damper 103 to discharge the waste gaseous heating medium into the boiler at the pass 104 intermediate the ends of the bank 105 of the boiler tubes. The passage of the gases is then through the passes 106 and 107 to the outlet flue 108. The pass 110 for the supplemental furnace 111 is located at the opposite end of the bank of tubes 105, the gases from the supplemental furnace 111 entering then the pass 104 to mingle with the waste gaseous heating medium and continuing therewith the flue 108. A superheater is similarly provided having the one portion 112 located in the pass 110 and the other portion 113 located in the pass 104. The fuel burner 114 for the furnace may be located in the front furnace wall 116 and brought between water wall pipes 115.

I claim:

1. In the operation of a waste heat utilization plant comprising industrial furnaces affording a source of waste gaseous heating medium, and a waste heat boiler receiving the waste gaseous heating medium to generate steam therefrom: the method of operating said boiler which includes generating steam therein independently of the said waste gaseous heating medium admitted thereto by further heating said boiler at a point other than that at which it is initially subjected to said waste gaseous heating medium, and superheating the steam generated by subjecting it to one of the gaseous heating media, and then to the combined media.

2. The combination with a source of waste gaseous heating medium; of a waste heat utilization boiler having a plurality of passes, a setting for the boiler provided with an inlet and an outlet, means to introduce the said waste gaseous heating medium through said inlet and to one of said passes, a supplemental furnace associated with the boiler, means to introduce gaseous heating medium therefrom directly to another pass of the boiler, and means to combine beyond the passes both heating media for further heating of the boiler.

3. The combination with a source of waste gaseous heating medium; of a waste heat utilization boiler having a plurality of passes, a setting for the boiler provided with an inlet and an outlet, means to introduce the waste gaseous heating medium through said inlet to the first pass of the boiler, a supplemental furnace associated with the boiler, means to introduce gaseous heating medium therefrom directly to the second pass of the boiler, and means to combine beyond the passes both heating media for further heating of the boiler.

4. The combination with a source of waste gaseous heating medium; of a waste heat utilization boiler having at least three passes, a setting for the boiler provided with an inlet and an outlet, means to introduce the said waste gaseous heating medium through said inlet and to one of said passes, a supplemental furnace associated with the boiler, means to introduce gaseous heating medium therefrom to another pass of the boiler, and a superheater for the boiler located within the second and third passes of the boiler.

5. The combination with a source of waste gaseous heating medium; of a waste heat utilization boiler having a plurality of passes, a setting for the boiler provided with an inlet and an outlet, means to introduce the said waste gaseous heating medium through said inlet and to one of said passes, a supplemental furnace associated with the boiler, means to introduce gaseous heating medium therefrom to another pass of the boiler, and a superheater having two portions, the one exposed to the waste gaseous heating medium and the other to gaseous heating medium from the supplemental furnace.

6. The combination with a source of waste gaseous heating medium; of a waste heat utilization boiler having a plurality of passes, a setting for the boiler provided with an inlet and an outlet, means to introduce the said waste gaseous heating medium through said inlet and to one of said passes, a supplemental furnace associated with the boiler, means to introduce gaseous heating medium therefrom to another pass of the boiler, and a superheater having two portions, the one being located in the pass communicating with the supplemental furnace and the other portion being located beyond the pass communicating with the inlet for the waste gaseous heating medium.

7. The combination with a source of waste gaseous heating medium; of a waste heat utilization boiler of the inter-deck type and having a plurality of passes, a setting for the boiler provided with an inlet and an outlet, means to introduce the said waste gaseous heating medium through said inlet and to one of said passes, a supplemental furnace associated with the boiler, means to introduce gaseous heating medium therefrom to another pass of the boiler, and a superheater having two portions, the one being located in the inter-deck space of the pass communicating with the supplemental furnace and the other portion being located beyond the pass communicating with the inlet for the waste gaseous heating medium.

8. The combination with a source of waste gaseous heating medium; of a waste heat utilization boiler of the inter-deck type and having a plurality of passes, a setting for the boiler provided with an inlet and an outlet, means to introduce the said waste gaseous heating medium through said inlet and to one of said passes, a supplemental furnace associated with the boiler, means to introduce gaseous heating medium therefrom to another pass of the boiler, a superheater having two portions in series, the one being connected to the boiler drum and located in the inter-deck space of the boiler and subjected to the gaseous heating medium from the supplemental furnace, and the other portion subjected to the waste gaseous heating medium.

9. In heat exchange apparatus, a setting containing a water tube boiler, a direct fired furnace having at least a portion thereof below the boiler, a pass for the gases extending upwardly over the water tubes, another pass extending up over the water tubes, a supply channel for dust-laden gases leading to the latter pass, a commingling space where the two sets of cooled gases are commingled, and a further pass for the commingled gases extending over the water tubes.

10. A setting containing a water tube boiler, a direct fired furnace having at least a portion thereof below the level of the boiler, baffles forming two upward passes, one for the gases from the direct fired furnace and another for the dust laden gases from another source, a commingling space for the sets of gases, and a succeeding downward pass for the mixed gases over water tubes of the boiler.

FERNANDO FALLA.